United States Patent [19]

Randolph

[11] 4,077,483

[45] Mar. 7, 1978

[54] INVALID VEHICLE

[76] Inventor: Arthur J. Randolph, 4711 Sonoma Hwy., Santa Rosa, Calif. 94505

[21] Appl. No.: 614,750

[22] Filed: Sep. 19, 1975

[51] Int. Cl.² .................... B62D 11/02; B62D 23/00
[52] U.S. Cl. ............................ 180/6.5; 180/DIG. 3; 297/327; 297/348
[58] Field of Search ............... 180/6.5, 6.7, 8 A, 9.56, 180/DIG. 3; 280/5.22, DIG. 10; 305/12; 297/348, 325, 327, 328, 329

[56] References Cited

U.S. PATENT DOCUMENTS

| | | | |
|---|---|---|---|
| 2,592,023 | 4/1952 | Gleason | 180/6.5 X |
| 2,608,239 | 8/1952 | Gorden | 297/348 |
| 2,661,249 | 12/1953 | Bonmartini | 305/12 X |
| 3,231,036 | 1/1966 | Appenrodt | 180/6.5 |
| 3,259,200 | 7/1966 | Maijala | 280/5.22 X |
| 3,771,616 | 11/1973 | Parodi | 180/6.7 |
| 3,921,740 | 11/1975 | Forster | 180/DIG. 3 |

*Primary Examiner*—Joseph F. Peters, Jr.
*Assistant Examiner*—R. Schrecengost
*Attorney, Agent, or Firm*—Alvin E. Hendricson

[57] ABSTRACT

An electrically powered vehicle for an invalid has a track drive with pivoted idlers accommodating travel over obstacles and through uneven terrain and an electrically adjustable seat with an open front to facilitate seating of an invalid therein. Remote control affords the invalid user with the capability of calling the vehicle to bedside or the like whereby the invalid could use maximum freedom of movement.

2 Claims, 12 Drawing Figures

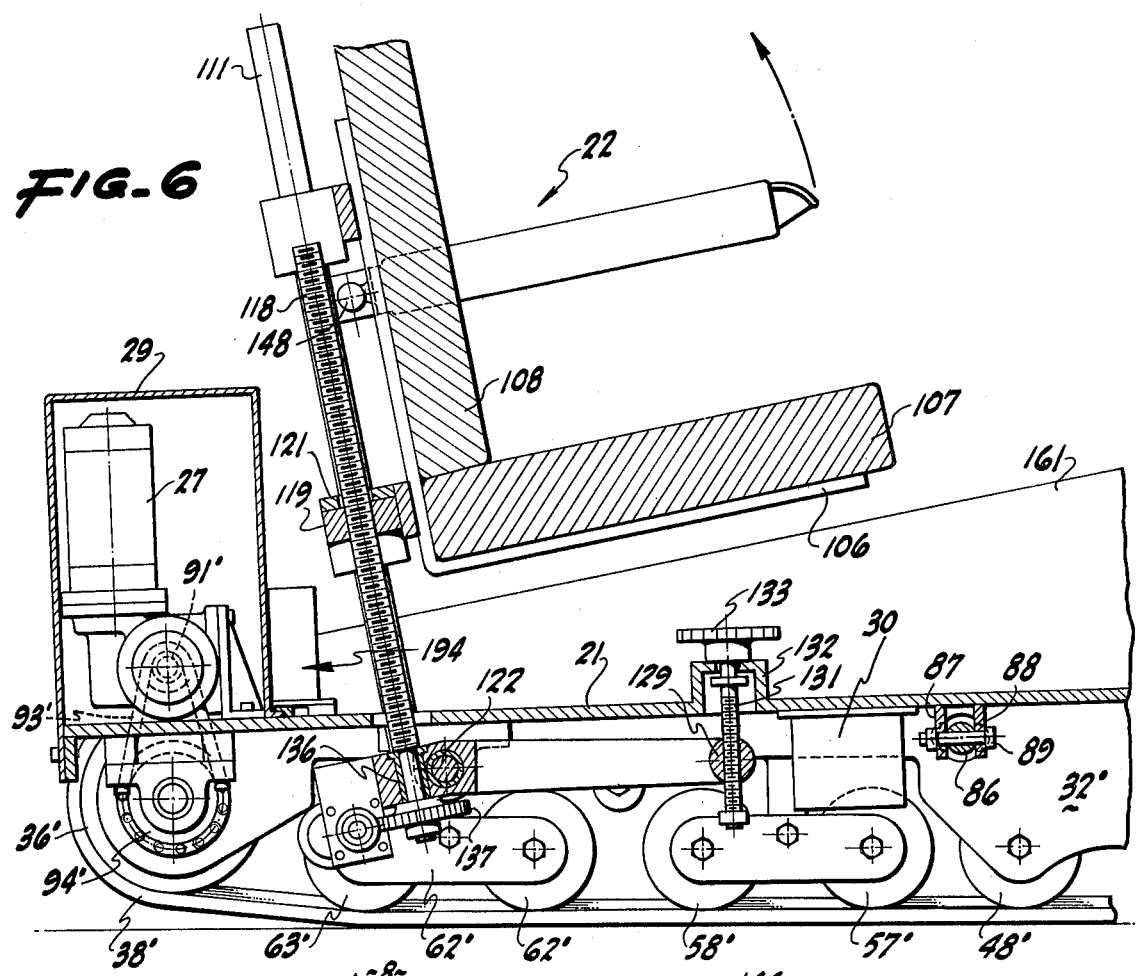
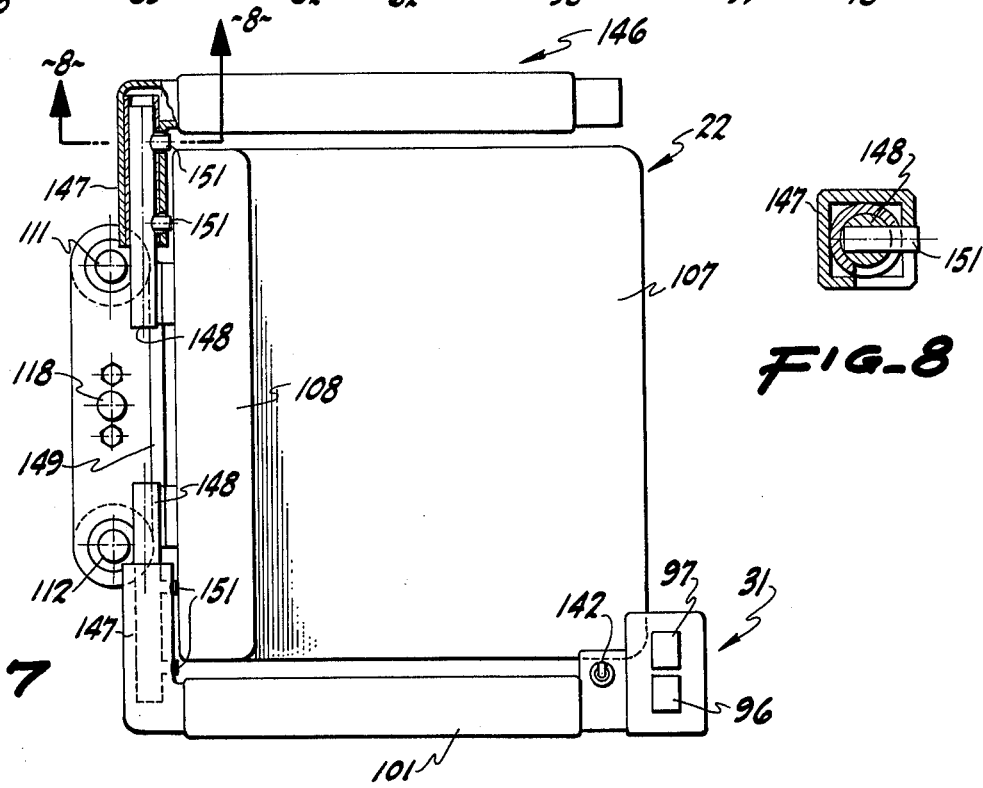

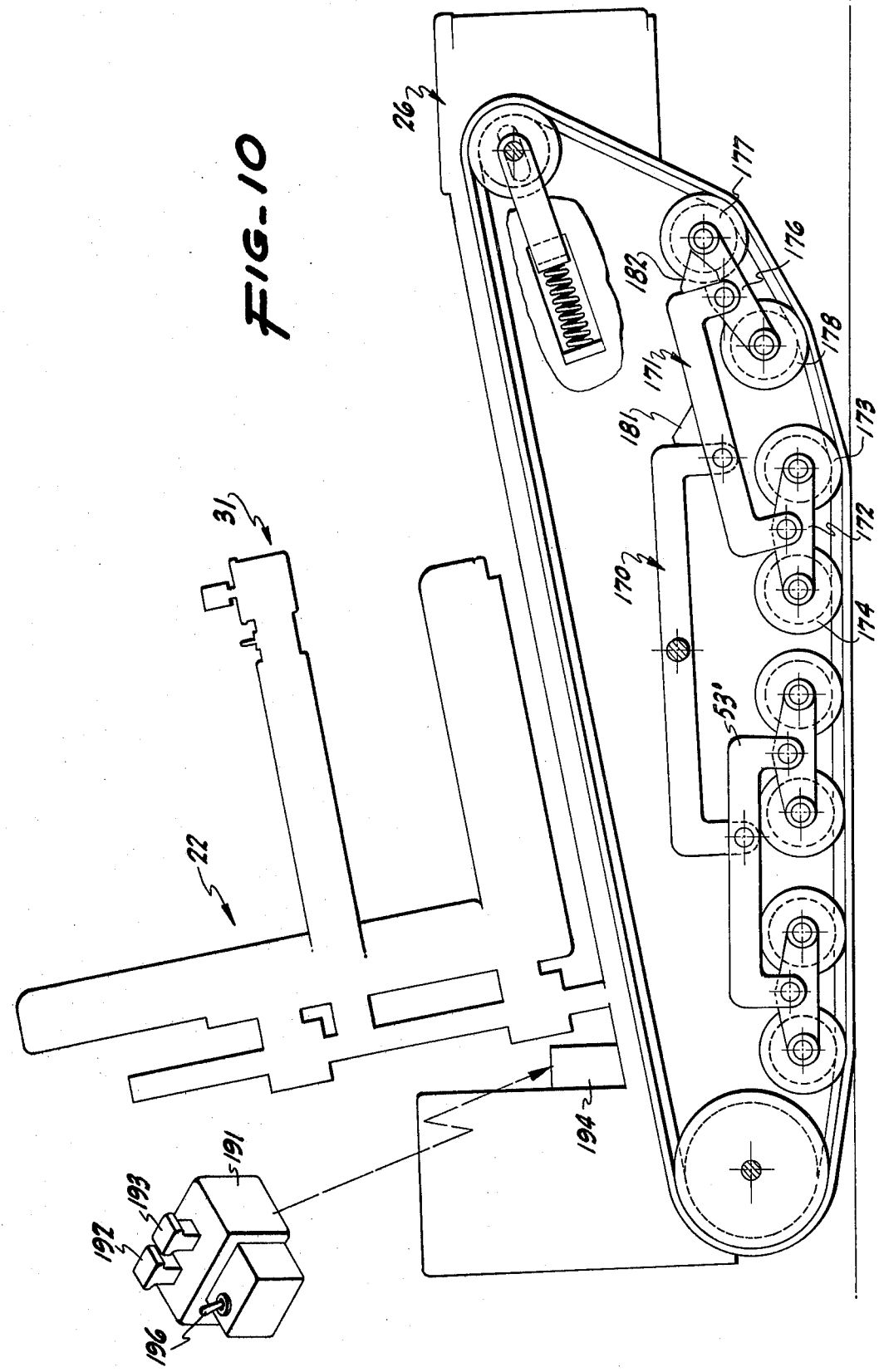

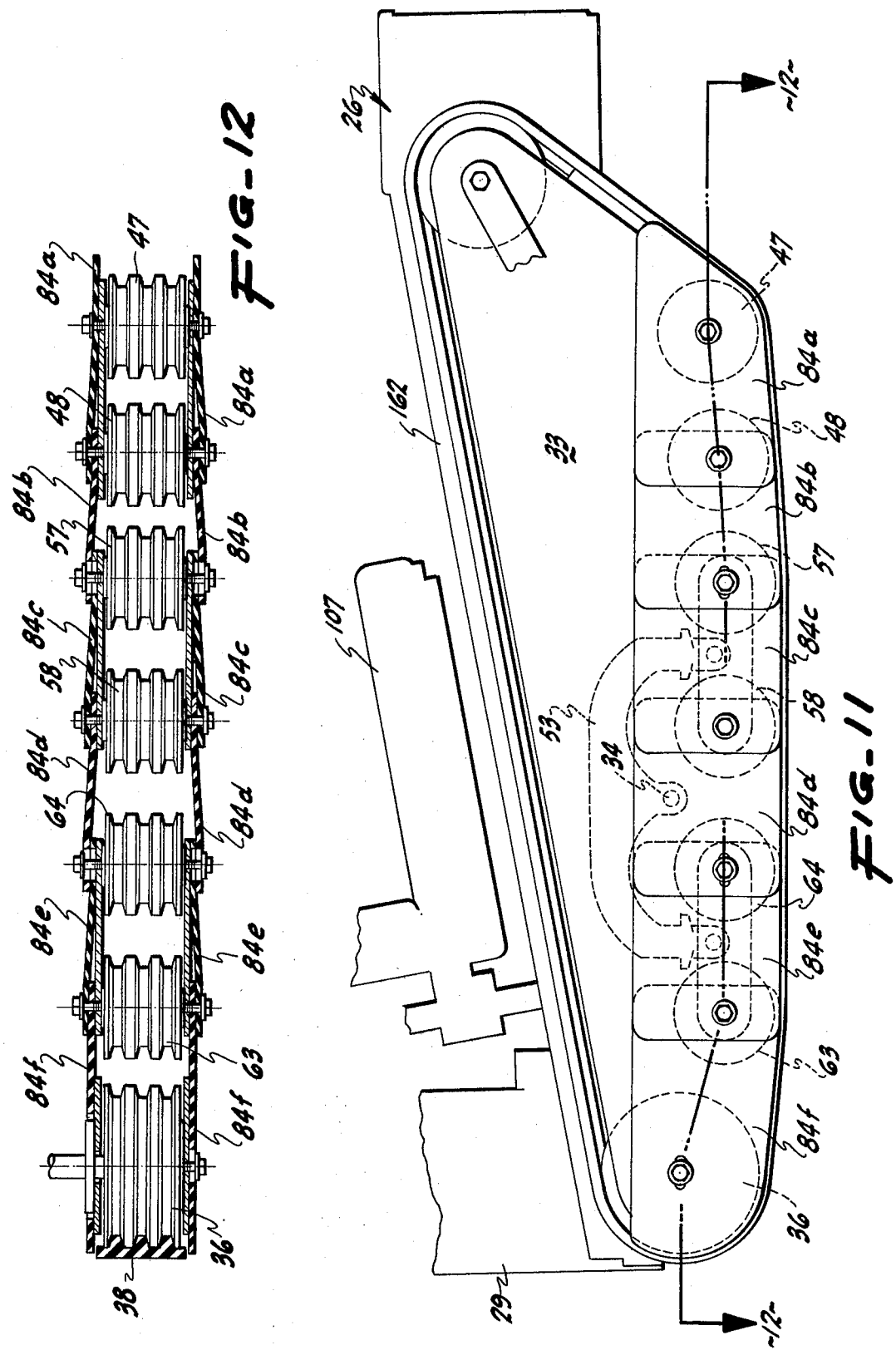

INVALID VEHICLE

BACKGROUND OF INVENTION

There have been developed a variety of different mechanical devices to assist invalids or disabled persons in moving about. Thus, various types of crutches and artificial limbs are available to assist some disabled persons; however, there remain a large number of such persons that are so seriously disabled that these types of devices are not applicable. The remaining alternative has been the wheelchair and various motorized versions thereof have been developed so that an invalid or disabled person seated therein may transport themselves from one location to another.

Conventional wheelchairs are normally designed to operate upon flat surfaces such as floors, sidewalks or the like, and wheelchairs are generally unsuited for utilization on any type of uneven terrain. Thus, for example, a disabled person in a wheelchair cannot normally traverse a common street curb or any type of soft surface such as heavily graveled walkways or soft earth.

The present invention provides a personalized mobile carrier for disabled persons which is particularly easy to enter and leave and which is specifically directed to traversing uneven terrain.

SUMMARY OF INVENTION

The present invention comprises a small electrically powered vehicle traveling upon a pair of flexible tracks passing over pivotally mounted idlers to thus readily traverse uneven terrain. An electrically adjustable seat accommodates the user and an open front structure facilitates entry and exit of the vehicle.

The vehicle carries electrical storage batteries for energizing separate drive motors powering separate tracks at the command of control means mounted on or adjacent the seat of the vehicle. Provision is made for limiting entrance of loose particles or the like into the track mechanism and for removing such particles as may enter the mechanism.

A remote control unit affords the user with the capability of commanding the vehicle to travel to bedside, for example, or chairside, so that the user may mount or enter the vehicle for transport therefrom and also for commanding the vehicle to move to a resting or storage place when not in use. The vehicle is intentionally designed with a low configuration wherein the user thereof is seated close to the ground to improve stability and also to afford the user the opportunity of performing many tasks normally requiring stooping or kneeling that might not otherwise be possible.

DESCRIPTION OF FIGURES

The present invention is illustrated as to particular preferred embodiments thereof in the accompanying drawings, wherein:

FIG. 6 is a central longitudinal vertical sectional view taken in the plane 6—6 of FIG. 4;

FIG. 7 is a top plan view of the seat of the vehicle taken in the plane 7—7 of FIG. 1;

FIG. 8 is a sectional view taken in the plane 8—8 of FIG. 7;

FIG. 9 is a partial sectional view of the adjustable mounting of a forward track wheel of the vehicle taken in the plane 9—9 of FIG. 1;

FIG. 10 is a side elevational view of an alternative embodiment of the pivotal idler wheel arrangement of track drive mechanism generally illustrated to be mounted in the vehicle of the present invention;

FIG. 11 is a partial side elevational view of the vehicle of the present invention and showing side guards which have been omitted from other figures for the purpose of better showing the track structure; and FIG. 12 is a longitudinal sectional view of one track mechanism taken in the plane 12—12 of FIG. 11.

DESCRIPTION OF PREFERRED EMBODIMENTS

Figure 1:
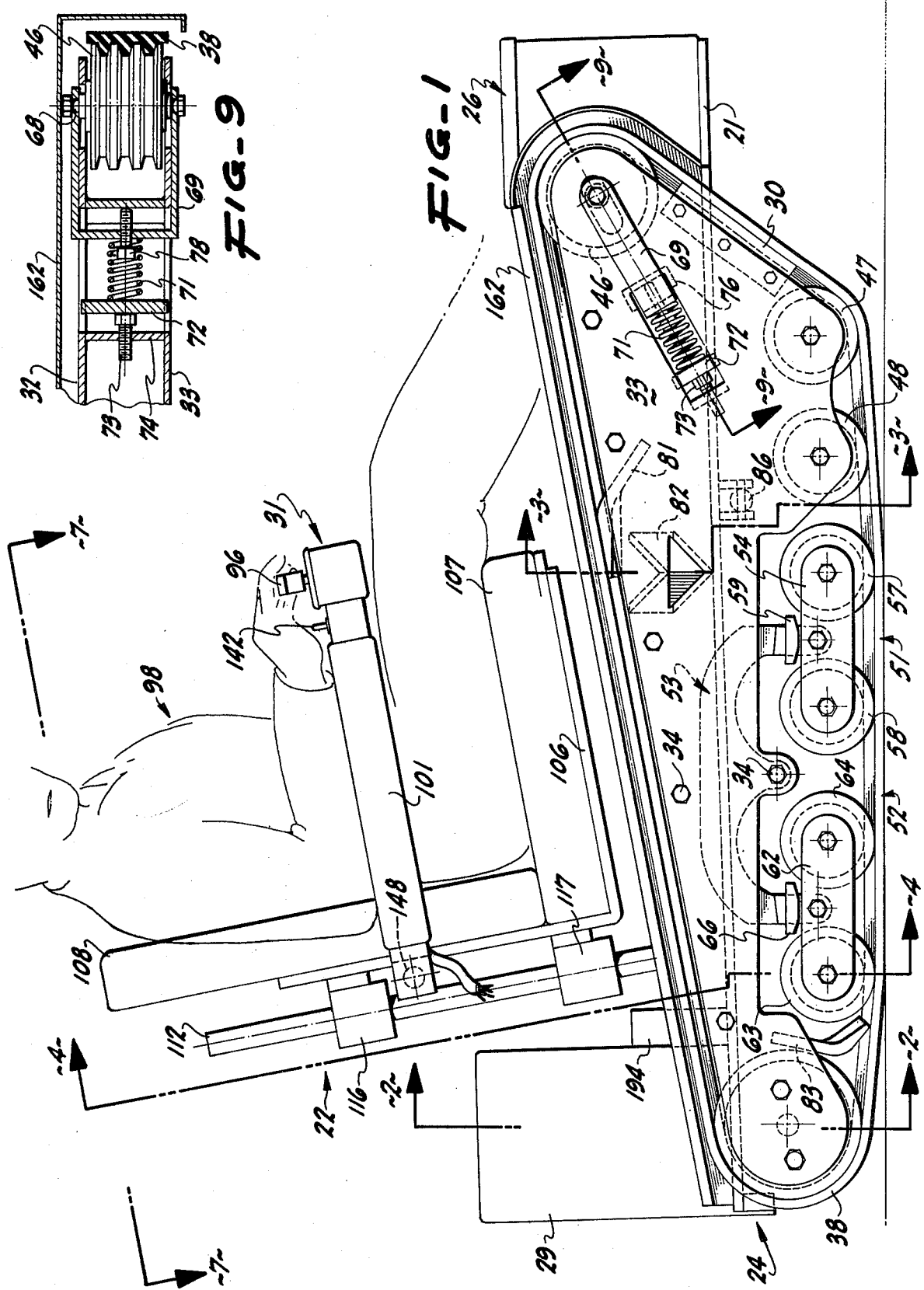
FIG. 1 is a side elevational view of the vehicle of the present invention.
Figure 2:
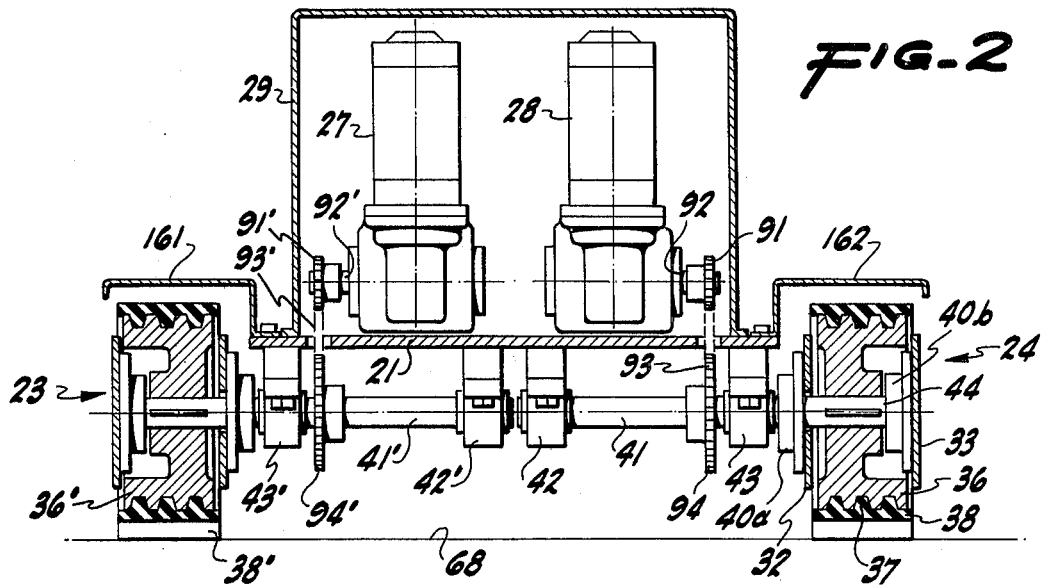
FIG. 2 is a vertical sectional view taken in the plane 2—2 of FIG. 1.
Figure 3:
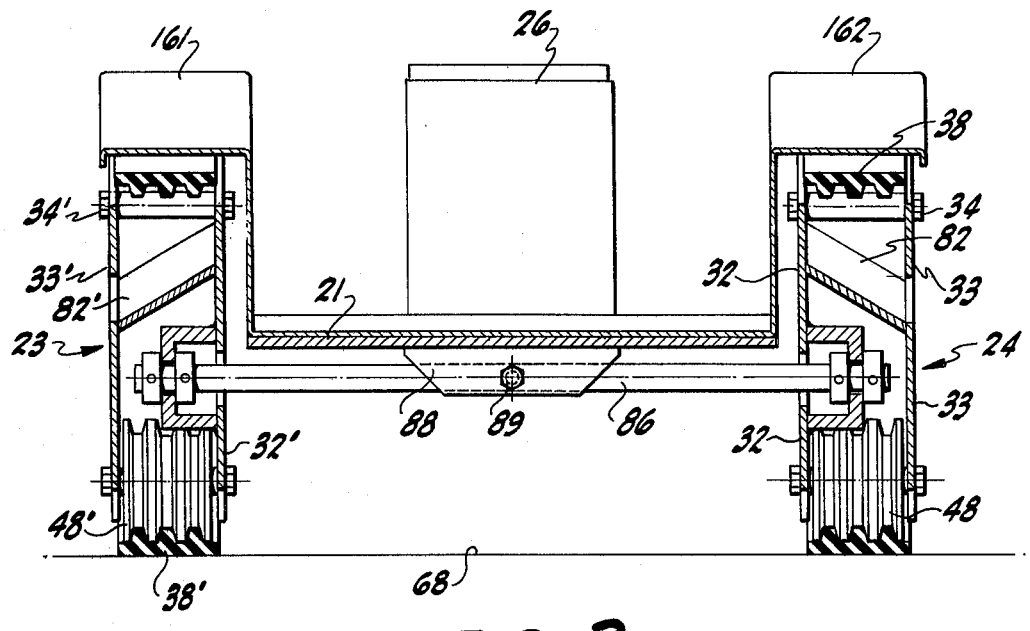
FIG. 3 is a vertical sectional view taken in the plane 3—3 of FIG. 1.

The invalid vehicle of the present invention, as shown in FIGS. 1 to 3 of the drawings, includes a structurally rigid floor plate 21 upon which there is disposed a seat structure 22 and at each side of which there is mounted separate track mechanisms 23 and 24. At the front center of the vehicle there is mounted one or more storage batteries suitably enclosed in a container 26 and at the rear of the vehicle there are provided a pair of electric motors 27 and 28 covered by a housing 29 and electrically connected to the batteries 26 through control means 31 disposed on the seat 22. The motors 27 and 28 are separately connected to the track mechanisms 23 and 24, respectively, and the control means 31 serves to energize either or both of the motors for propelling the vehicle by means of the track mechanisms 23 and 24. There is also provided a battery charger 30 which may include a transformer and rectifier with an electrical cord adapted to engage a conventional electrical outlet. The charger 30 may be mounted, for example, beneath the floor 21, as shown in FIG. 6, and is connected to the battery in battery housing 26.

Considering now the track mechanisms, it is noted that they are substantially identical and thus only mechanism 24 is herein described. Track mechanism 24 includes a pair of spaced vertically disposed side plates 32 and 33 having the upper surfaces thereof tapered downwardly and rearwardly from the front of the plate, as best shown in FIG. 1. The side plates 32 and 33 are bolted together, as indicated at 34, with appropriate spacers between the plates to maintain their separation. At the rear of the vehicle between the plates 32 and 33, there is disposed a drive wheel 36 which has a plurality of peripheral grooves 37 thereabout to accommodate a multiple grooved V-belt 38 extending about the drive wheel. The drive wheel 36 is carried upon a drive shaft 41 that is mounted on bearings 42 and 43 secured to the underside of the floor plate 21. On each side of the drive wheel 36, the drive shaft 41 carries a bearing 40a and 40b to which is secured a plate and the track mechanism side plates 32 and 33 are bolted to such plates. The drive shaft 41 is keyed to the drive wheel 36 as indicated at 44 of FIG. 2.

The V-belt 38 is an endless belt formed of rubber or the like, with internal grooves and ridges to fit tightly about the drive wheel 36 and the V-belt extends forwardly from the top of the drive wheel about a front wheel 46 at the upper forward end of the track mechanism and thence downwardly and beneath a pair of fixed idler wheels 47 and 48 and beneath first and second sets 51 and 52, respectively, of pivotally mounted idler wheels ahead of the drive wheel 36. Each of the aforementioned wheels is peripherally grooved to thus tightly engage the ridged and grooved inner surface of the V-belt 38. It is provided herein that at least certain of the idler wheels engaging the V-belt upon the surface being traversed by the vehicle shall be pivotally mounted so that the vehicle may readily pass over obstacles or uneven surfaces.

Referring particularly to FIG. 1, it will be seen that there is provided a yoke 53 pivotally mounted upon a cross piece such as one of the bolts 34 between the side plates 32 and 33 and having a first portion extending forwardly of its pivotal mounting into pivotal connection with a pair of links 54 aligned with side plates 32 and 33 and having idlers 57 and 58 rotatably mounted therebetween at opposite ends of the links. This comprises the first pair of pivotally mounted idlers 51 noted above, and there is provided upon this forwardly extending portion of the yoke 53 above the links 54 a mechanical stop 59 limiting the pivotal motion of the links 54.

Figure 4:
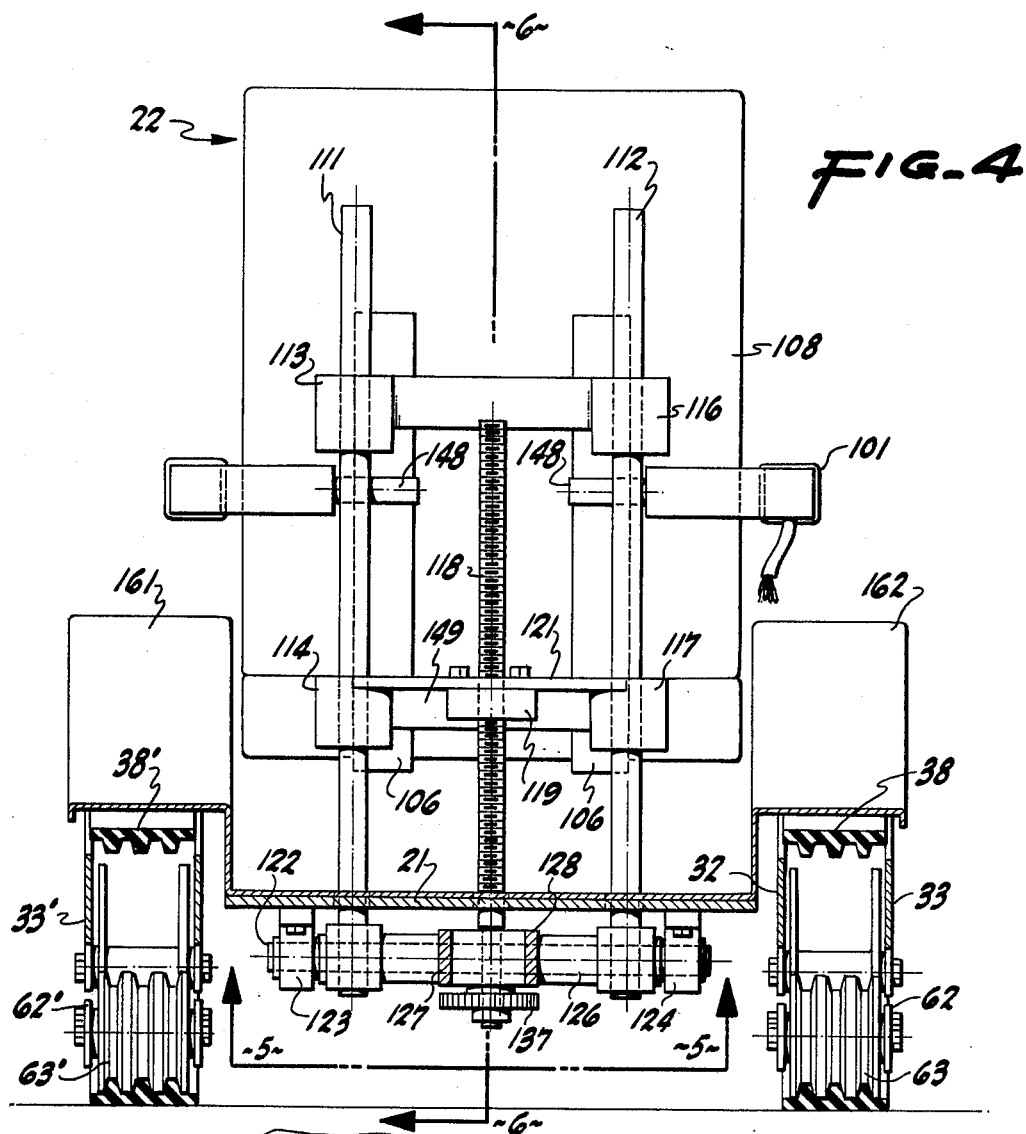
FIG. 4 is a vertical sectional view taken in the plane 4—4 of FIG. 1.
Figure 5:
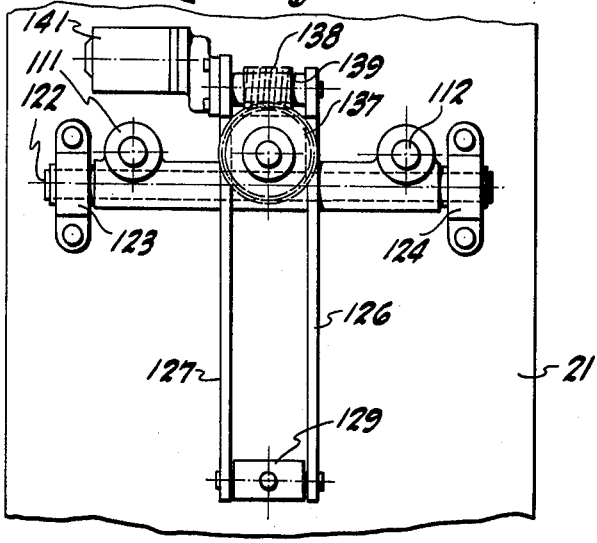
FIG. 5 is a partial bottom plane view of the vehicle taken in the plane 5—5 of FIG. 4.

The second pair of pivotally mounted idler wheels 52 are mounted in a similar manner to the first pair in that the pair of links 61 and 62 are pivotally mounted on the rear portion of the yoke 53 and a pair of idler wheels 63 and 64 are rotatably mounted between opposite ends of these links, as partially illustrated in FIG. 4. A mechanical stop 66 is secured to the yoke 53 to limit pivotal movement of the links 61 and 62. The lower portion of the side plates 32 and 33 are cut as generally indicated in FIG. 1 to accommodate pivotal movement of the pair of idler wheels 51 and 52.

It will be appreciated that as the track mechanism 24, for example, passes over the bump or the like upon the surface 68 upon which it is traveling, the front pair of idler wheels 51 may pivot upwardly by pivoting of the yoke 53 and furthermore the individual wheels 57 and 58 of the pair 51 may pivot relative to each other so that the track mechanism then readily passes over bumps or the like upon the surface being traversed. As the mechanism moves over the obstacle the idler wheels at the center of the vehicle will move up and down as required to readily accommodate passage thereover without materially tipping or tilting the vehicle. At the front of the vehicle there is provided a low friction shoe or backing plate 67 formed of Teflon or the like, mounted between the side plates 32 and 33 of track mechanism 24, for example, and engaging the inner side of the belt 38. This shoe prevents the belt from being depressed or deflected inwardly of the vehicle when the latter engages a bump or the like, such as a street curb.

It will be further appreciated that as the track mechanism 24, for example, passes over a bump on the surface 68 the V-belt 38 will be pressed upwardly into the mechanism in the vicinity of the pivotally mounted idler wheels. Inasmuch as the V-belt is not particularly extensible, provision is herein made for accommodating this otherwise extended V-belt path. This accommodation is herein provided at the front wheel 46 of the vehicle. This wheel is raised from the surface 68 and is located at the upper front corner of the side plates 32 and 33, as illustrated in FIG. 1. Referring to FIGS. 1 and 9, it will be seen that the front wheel 46 is rotatably mounted on a shaft or axle 68 and, in turn, is mounted across the open end of a U-shaped bracket 69. This bracket 69 is spring loaded and mounted for translation inwardly or outwardly of the track mechanism 24. To this end, the bracket 69 is slidably mounted on the side plates with the base thereof extending through a slot in side plates 32 and 33 and bearing upon a compression spring 71, in turn engaging a spring plate 72. a spring bolt 73 is threaded through a cross piece 74 between the plates 32 and 33 and extends through the spring plate 72 and through the spring 71 and bracket 69 into bearing relationship with another cross piece 76 secured between the side plates 32 and 33. A nut 77 threaded on the spring bolt 74 is employed to set the position of the spring plate 72 and a second nut 78 may be threaded on the spring bolt to provide a mechanical stop for limiting inward travel of the bracket 69. It will be seen that with the structure of FIG. 9, increased tension on the belt 38 will move the wheel 46 inwardly of the track mechanism against the force of the compression spring 71, and this will consequently accommodate movement of the idler wheels. Additionally, this spring loaded structure provides for maintaining the V-belt under tension at all times so as to insure tight fit of same about the track mechanism.

The V-belt 38 of the track mechanism 24 is moved by the drive wheel 36 so as to move the vehicle along a surface 68. Inasmuch as the vehicle of the present invention is adapted to negotiate various types of terrain including those of sand, gravel, dirt and the like, provision is herein made to prevent clogging of the track mechanism or damage to the belt thereof. To this end, there is provided a belt scraper 81 disposed along the underside of the V-belt 38 at the top of the track mechanism and engaging the inner surface of the belt 38. The scraper 81 is mounted on the inner plate 32 and has a discharge trough or the like 82 extending therefrom through one of the side plates 32 or 33 so that particles scraped from the belt slide out of the mechanism. A second flexible scraper blade 83 may be mounted to clean the inside of the belt ahead of the drive wheel 36, as shown in FIG. 1. This blade may be mounted on the plate across the end of the drive shaft and the blade is preferably slanted across the belt so that particles scraped from the belt thereby are discharged from a side of the belt. Additionally, as shown in FIGS. 11 and 12, side guards or skirts 84a to 84f are provided on each side of the belt 36 along the lower traverse thereof to keep as much loose material such as gravel or the like out of the track mechanism as possible. These skirts are formed of a relatively stiff material, such as a rubberized fabric for example, and overlap each other along both inner and outer sides of each track mechanism. The guards or skirts are pivotally mounted on extensions of the wheel axles, as shown, and lost motion provision may be made as indicated at wheels 36, 64 and 57. These guards are omitted from the other figures of the drawings for the sake of clarity of illustration; however, they are normally provided as a portion of the vehicle of the present invention.

In addition to the connection of the track mechanisms 23 and 24 to the floor plate 21 by means of the drive shafts, there is also provided a pivotal connection by means of a cross shaft 86 best seen in FIGS. 3 and 6. The cross shaft 86 is secured at opposite ends thereof to the track mechanisms 23 and 24 as, for example, in the manner illustrated in FIG. 3. The cross shaft 86 is pivotally mounted at the center thereof between a pair of support plates 87 and 88 secured to the underside of the floor plate 21 with this pivotal connection being accomplished by a pin or bolt 89 extending through the support plates and shaft perpendicularly to the latter and in rotatable engagement therewith. With this manner of mounting, the track mechanisms may move upwardly or downwardly from their normal positions and passage over an obstacle or the like on the surface upon which the vehicle is traveling. This degree of pivoting is limited by the available pivotal movement of the cross shaft; however, with this pivotal mounting the floor of the vehicle remains much less free from jolting or tilting than would otherwise be the case when the vehicle traverses uneven terrain.

Propulsion of the vehicle hereof is accomplished by a pair of electric motors 27 and 28, as noted above. The drive mechanism, as best illustrated in FIGS. 2 and 6, is substantially identical for each track mechanism, and referring to track mechanism 23, it will be seen that the motor 27 has a gear 91 on the drive shaft 92 thereof with a belt or chain 93 connecting this gear 91 with a gear 94 secured to a drive shaft or axle 41'. This axle is mounted between bearings 42' and 43' secured to the underside of the floor plate 21. The drive shaft or axle 41' engages the drive wheel 36' of track mechanism 23 in the same manner as the wheel 36 engages the track mechanism 24. Energization of the motor 27 will drive the axle 41' through the belt or chain drive 93 to rotate the drive wheel 36' in either a forward or backward direction and thus to move the V-belt 38' for propelling the vehicle over a surface 68. Similarly, operation of the electric motor 28 in either a forward or reverse direction will serve to move the V-belt 38 of mechanism 24 to drive the right side of the vehicle forwardly or backwardly. It will be appreciated that with this type of belt or track propulsion, the vehicle is provided with extreme maneuverability and steering is accomplished by controlling the ratio of travel of the separate track mechanisms. Thus if it is desired to make a right turn, or example, the track mechanism 23 is operated at a greater rate than the track mechanism 24 and it is, in fact, possible even to make a turn without substantial forward or reverse movement merely by operating one track mechanism in the forward direction and the other track mechanism in the reverse direction.

The drive motors 27 and 28 are electrically connected to the battery or batteries in the container 26 by the control means 31. Such control means may have a single operating lever or joy stick, or may have a pair of levers. In FIGS. 1 and 7 there are shown a pair of levers 96 and 97 which are pivotally mounted so that an operator 98 may move the lever 96, for example, forward to move belt 38 of track mechanism 24 in a clockwise direction, as viewed in FIG. 1. This will cause the right side of the vehicle to move forwardly. Pivoting of the control lever 96 rearwardly by the operator 98 connects the electric motor 28 to operate in a reverse direction so that the belt 38 moves in a counterclockwise direction for moving the right side of the vehicle in a reverse direction. The second lever 97, similarly operable, is provided for the track mechanism 23 and is preferably located along side of lever 96. Thus, it is quite simple for an operator to control forward, reverse or turning of the vehicle. The control means 31 includes switches operable by the levers to control energization of the drive motors. With a single lever arrangement, the lever is merely moved in the direction it is desired to propel the vehicle. Thus movement of the lever to the right, for example, connects the motors to turn the vehicle to the right and a sharper turn is accomplished by moving the lever to the right and rear. The control means 31 may be mounted in a variety of positions and in the drawings the control means are illustrated to be mounted at the front end of the right arm of the seat 22. The control means may alternatively be mounted on the left arm or on the floor for foot control. Bearing in mind the various possible physical disabilities of invalids, it may be desirable to provide the control means on a head rest of the seat so that a paraplegic may control the vehicle by head movement.

Considering now the seat 22 and mounting mechanism therefor, reference is made to FIGS. 4 to 7. The seat 22 includes an angle support plate 106 carrying a seat cushion 107 and a back cushion 108 and mounted upon a pair of spaced, vertical guide rods 111 and 112. This mounting is accomplished by a first pair of blocks 113 and 114 secured to the back upright portion of the angle support plate 106 and having a vertical opening therethrough for slidably engaging the vertical guide rod 111. A second pair of blocks 116 and 117 are secured to the back of the vertical portion of the angle support plate 106 and likewise have central openings therethrough to slidably engage the vertical guide rod 112. It will be seen that with this structure the seat is vertically movable along the guide rods 111 and 112. This vertical movement is controlled and accomplished by a threaded shaft 118 extending generally vertically between the guide rods 111 and 112 and threaded through a block 119 which may, for example, be secured to the angle support plate 106 by being bolted to a cross plate 121 between the blocks 114 and 117.

The entire seat 22 is mounted upon a cross shaft 122 carried in end bearings 123 and 124 beneath the floor plate 21. The cross shaft 122 extends through a shaft housing 126 having bosses thereon mounting the vertical guide rods or bars 111 and 112. A pair of pivot plates 127 and 128 are secured to the shaft housing 123 and extend forwardly therefrom in parallel spaced relation into pivotal engagement with a cross bar 129 extending therebetween. This cross bar 129 has a bolt 131 threaded transversely therethrough and this bolt has an unthreaded upper end thereof extending through a bracket 132 in the floor plate 21 with an adjusting knob 133 atop the bolt upon the bracket. It will thus be seen that by turning knob 133 the cross shaft 129 may be moved generally vertically of the bolt 129 to thus pivot the plates 127 and 128 and consequently to pivot the seat 22. The bolt 131 has a lower flange or lock nut and also is provided with a flange beneath the bracket 132, as illustrated in FIG. 6. The shaft housing 126 carrying the vertical guide rods or bars 111 and 112 may be pivoted by the knob 133 so that the seat may be pivoted as indicated by the dashed lines in FIG. 6.

The threaded shaft 114 of the seat 22 is mounted in a bushing or bearing 136 secured in a central boss on the shaft housing 126 and extends through this boss to terminate in a gear 137. This shaft gear 137 engages a worm gear 138 mounted on a gear shaft 139 rotatably carried between rearward extensions of pivot plates 127 and 128. Controlled vertical adjustment of the position of seat 22 is powered by a small electric motor 141 mounted upon one of the pivot plates 127 and connected to the gear shaft 139. Control of the motor 141 is provided by a switch arm 142 which may be moved forward or back, and which is preferably mounted adjacent the control means 31 on the arm 101 of the seat 22. An operator may thus move the seat 22 up or down by moving the switch arm 142 forwardly or backwardly to thus energize the motor 141 to move in a forward or reverse direction. As the motor 141 operates to rotate gear shaft 139, it will be seen that the connection of worm gear 138 and threaded shaft gear 137 will cause the shaft 118 to rotate in either of two directions. As the shaft 118 rotates, it will move the seat up or down by means of the threaded connection of the shaft with the threaded block 119 secured to the seat. All possibility of cocking of the seat, i.e., lateral movement thereof, is prevented by the vertical guide rods or bars 111 and 112. Tilting of the seat is readily accomplished by turning the knob 133 as described above and, or course, it will be appreciated that this knob also may be powered as by providing gear teeth thereabout and mounting of a small electric motor and gear connection therewith with a further switch control adjacent the control means 31 so that the operator may electrically control tilting of the seat 22.

The seat of the vehicle of the present invention is mounted as described above quite closely to the surface upon which the vehicle is adapted to travel for the particular purpose of facilitating entry of the vehicle by an invalid or the like, and also for the purpose of providing such an invalid or the like the opportunity of reaching such surface by hand. It is well known that invalids who are confined to wheelchairs cannot normally perform any functions upon the ground or floor without physical assistance from other human beings. The present vehicle seats an invalid in such a position that they may physically reach the surface upon which the vehicle is traversing. In order to facilitate this physical capability of an operator 98 within the vehicle hereof, and also under specialized circumstances to facilitate entry and exit of the invalid to and from the vehicle, it is herein provided that one of the arms 146 of the seat 22 is pivotally mounted so as to provide an opening at one side of the seat. This may be readily accomplished herein by the structure illustrated, for example, in FIGS. 7 and 8, wherein the arm 146 has a right angle cylindrical extension 147 fitting over a stub shaft 148 secured as by welding or the like to a plate 149 across the back of the angle support plate 106. The right angle cylinder 147 has projections 151 extending into slots in the stub shaft 148 so that the arm 146 is pivotally mounted for vertical movement between a normal position such as that shown in FIG. 6, for example, and a vertically displaced position.

There has been described above the main structural features of the present invention. However, it is noted that various additions thereto may be made and in this respect reference is made to FIGS. 1, 2 and 3, for example, wherein there are shown covers or fenders 161 and 162 extending over the belts 38' and 38, respectively, alongside the seat 22. These fenders or covers preferably extend downwardly about the upper front wheels 46 and 46' into engagement with a cross piece mounting the battery container 26. Various other additions may also be provided and certain alternatives of the present invention may be made, such as described below.

In order to accommodate the vehicle hereof to the traverse of extremely uneven terrain, the side or track portions of the vehicle may be modified in various ways such as, for example, that illustrated in FIG. 10. Referring now to FIG. 10 wherein elements similar to those identified in FIG. 1 carry the same numerals with primes thereon, it is noted that yoke 53' is, in turn, pivotally carried by a secondary yoke 170. The secondary yoke 170 is pivotally mounted adjacent the center thereof, and in turn a forward portion of same is pivotally connected to a tertiary yoke 171 which is pivotally connected at the rear end thereof to side plates 172 carrying front and back wheels 173 and 174. At the forward end of the yoke 171, pivotal connection is made to a plate 176 carrying at the opposite ends thereof wheels 177 and 178. It will be seen that with this construction generally illustrated in FIG. 10 and, of course, applicable to both track mechanisms, the vehicle of the present invention is capable of moving the wheels of each track mechanism in a multiplicity of movements to accommodate quite uneven terrain. The yoke 170 will be seen to be connected to yoke 53' ahead of the center thereof, and to be connected to the yoke 171 rearwardly of the center thereof. This manner of connection concentrates the weight of the vehicle and occupant near the center of the vehicle to facilitate turning of the vehicle. In the embodiment of FIG. 10, the track wheels are movable to a greater extent than in the embodiment of FIG. 1, and consequently cut-outs in the side plate 33, for example, must be made more extensive. It is preferable in this embodiment to provide some sort of limitation upon the pivotal motion of the yokes or wheel support plates. To this end, there are preferably provided stops such as indicated at 181 and 182.

The invalid vehicle of the present invention is particularly adapted to the mobilization of a person who cannot otherwise walk or move terrain. Although this invention incorporates various concepts otherwise employed in other fields of art, it is noted that such concepts are herein particularly directed to and adapted for the mobilization of a person or human being whose legs are unable to carry such person about. In order to maximize the utility of the present invention, there may be provided in connection with the vehicle described above, a remote control unit 191 for operating the control means 31 at a distance from the vehicle. This remote control unit 191 may be relatively conventional in itself in comprising merely a low power transmitter and a signal generator, operable as by levers 192 and 193 to transmit command signals that are picked up by a receiver 194 on the vehicle. The transmitter 191 may radiate a high frequency sonic signal, for example, and the receiver 194, shown to be mounted on the floor 21 behind the seat 22, includes receiving means and relays operated by signals therefrom to energize and de-energize electric motors of the vehicle. Preferably the remote control unit also includes a seat control lever 196 whereby the seat height may be remotely adjusted to facilitate entry of the vehicle by an invalid. The relays of the receiver are electrically connected between the battery and electric motors so that the vehicle may be fully operated remotely. In this manner an invalid positioned in a bed, chair or the like, may employ their remote control unit 191 to move the vehicle into position for entry by the person. Alternatively, the invalid moves the vehicle away from himself to park the vehicle in the corner of a room, for example, when the vehicle is not in use.

The invalid vehicle of the present invention is highly advantageous in providing mobility to a person whose legs are of little or no use to the person. the front construction of the vehicle which is open on each side of the battery box is particularly advantageous in allowing a person to enter the vehicle from the front by backing up to the vehicle and straddling the battery box while moving himself into the seat. The low, adjustable position of the seat affords the user the opportunity of reaching the ground or surface upon which the vehicle is resting, and also affords maximum stability of the vehicle because of the low center of gravity of the vehicle and the person seated therein. The vertically adjustable seat hereof is further advantageous in providing the capability of raising an invalid in the vehicle to table height so that the invalid may eat or work at a table of normal height. The track drive of the vehicle affords the capability of moving over quite uneven terrain and even climbing over street curbs, while at the same time providing very good maneuverability. The invention as described provides a single drive speed, although it is, of course, possible by electrical or mechanical means to provide a speed range.

Although the present invention has been described herein with respect to particular preferred embodiments thereof, it will be appreciated by those skilled in the art that modifications and variations may be made within the spirit and scope of the invention, and thus it is not intended to limit the invention to the precise terms of description or details of illustration.

What is claimed is:

1. An invalid vehicle comprising:
   a floor carried between two track mechanisms with each having an endless belt about same and pivotally mounted idler wheels and a rear drive wheel along the bottom engaging the belt,
   two electric motors mounted on said floor with a separate one connected to drive each track mechanism through a drive wheel,
   said floor being mounted below the top of said drive wheels between said wheels by means mounting said floor in limited pivotal relation to said two track mechanisms, said means comprising fixed rear floor mounts secured to drive wheel shafts and a cross shaft extending laterally between said track mechaisms and pivotally connected to said floor forward of said rear mounts,
   battery means carried by said floor,
   a seat adjustably mounted on said floor between said track mechanisms for controlled positioning against said floor to provide an occupant with the capability of reaching a surface upon which the vehicle rests, and
   control means adjacent said seat for connecting and disconnecting said battery means to separate electric motors to propel and maneuver said vehicle.

2. An invalid vehicle comprising:
   a floor carried between two track mechanisms with each having an endless belt about same and pivotally mounted idler wheels and a rear drive wheel along the bottom engaging the belt,
   two electric motors mounted on said floor with a separate one connected to drive each track mechaism through a drive wheel,
   said floor being mounted below the top of said drive wheels between said wheels,
   battery means carried by said floor,
   a seat adjustably mounted on said floor between said track mechanisms by a seat mechanism including an upright seat support member pivotally mounted on a transverse shaft carried by said floor and including a pivot arm threadably engaging an adjusting bolt for controllably tilting of said seat, said upright seat support member including a pair of guide rods extending through seat elements in sliding relation thereto and a threaded shaft threadably engaging a seat element, and seat drive means including an electric motor mounted on said support member and connected to said threaded shaft for operation by said control means for moving said seat up and down the guide rods of said support member for controlled positioning of said seat against said floor to provide an occupant with the capability of reaching a surface upon which the vehicle rests, and
   control means adjacent said seat for connecting and disconnecting said battery means to separate electric motors to propel and maneuver said vehicle.

* * * * *